United States Patent [19]

Kim

[11] Patent Number: 5,657,802
[45] Date of Patent: Aug. 19, 1997

[54] ONE TOUCH OPENING PLUG FOR AQUARIUM FISH FOOD CONTAINERS

[76] Inventor: Sung-Tae Kim, #253-6 Nonhyun-dong, Kangnam-gu, Seoul, Rep. of Korea

[21] Appl. No.: 565,853

[22] Filed: Dec. 1, 1995

[51] Int. Cl.⁶ ........................................... B65B 1/04
[52] U.S. Cl. .................. 141/381; 141/22; 220/212; 222/192; 222/556
[58] Field of Search .................... 222/192, 556; 220/212, 212.5; 215/228, 391; 73/426; 141/381, 22

[56] References Cited

U.S. PATENT DOCUMENTS 2,942,752  6/1960  Brunel ........................ 141/381
3,312,366  4/1967  Poris ........................... 141/381
3,550,805  12/1970  Leonforte .................... 220/212

*Primary Examiner*—Philippe Derakshani
*Attorney, Agent, or Firm*—Birch, Stewart, Kolasch & Birch, LLP

[57] ABSTRACT

An improved plug structure for aquarium fish food containers is disclosed. The plug of this invention has two depressions for receiving a detachable tap and a detachable spoon respectively. The tap is pivoted to the spoon and easily opened by a one touch motion. Both the spoon and the tap can be easily separated from the plug body at the same time. The above plug thus allows the fixed amount of food to be taken out of the food container thereby saving food. The plug also prevents food from dropping when measuring the fixed amount of food using the spoon.

1 Claim, 3 Drawing Sheets

ONE TOUCH OPENING PLUG FOR AQUARIUM FISH FOOD CONTAINERS

BACKGROUND OF THE INVENTION

1. Field of the Invention

The present invention relates in general to a plug for aquarium fish food containers and, more particularly, to a structural improvement in such a plug for pivoting a plug opening tap to a measuring spoon and thereby easily opening the tap by slightly depressing the pivoted portion between the tap and spoon and simply separating the spoon from the plug by lifting up the opened tap prior to measuring the fixed amount of food.

2. Description of the Prior Art

In order to feed the aquarium fish with powdered or granulated food, the food may be taken out of a food container by a bowl or hand and sprinkled into an aquarium. However, feeding the aquarium fish using a bowl or hand as described above is problematic in that it is not only unsanitary, but also cannot precisely measure the fixed amount of food. Furthermore, use of the bowl or hand for feeding the aquarium fish may also cause excessive feeding thereby not only wasting food, but also muddling water in an aquarium.

In order to rectify the above problems, this applicant proposed a food container's plug structure with a detachable spoon suitable to measure the fixed amount of food as disclosed in the applicant's Korean U.M. Registration No. 70640 (Korean U.M. Appln. No. 90-13744, filed Sep. 4, 1990).

A food container with the above plug structure is shown in FIG. 5. As shown in the drawing, a detachable measuring spoon 20' is provided in the container's plug 10'. In order to spoon the food out of the food container 100 for feeding the aquarium fish, a user separates the spoon 20' from the plug 10' and fills the food with the spoon's bowl 21' prior to sprinkling the food into the aquarium. However, as a food outlet opening 11' of the container's plug 10' is enlarged sufficiently to receive the spoon's bowl 21', the food may suddenly pour out of the container 100 when spooning the food out of the container 100.

Furthermore, an excessive amount of food may be filled in the spoon's bowl 21' and will drop when spooning the food. Therefore, the above food container's plug structure may cause food to be wasted. Another problem of the above plug structure is resided in that the fixed amount of food to be sprinkled cannot be precisely measured as the spoon's bowl 21' has a large size.

SUMMARY OF THE INVENTION

It is, therefore, an object of the present invention to provide an improved plug structure for aquarium fish food containers in which the above problems can be overcome and which has a small-sized food outlet opening and thereby properly measures the amount of food to be sprinkled into an aquarium.

It is another object of the present invention to provide an improved plug structure for aquarium fish food containers which allows the fixed amount of food to be taken out of a food container, thereby saving food.

It is a further object of the present invention to provide an improved plug structure for aquarium fish food containers which is provided with a one touch tap suitable to open the food outlet opening by a one touch motion and to easily separate a measuring spoon from the container by simply levering the tap and thereby simplifies using the measuring spoon.

In order to accomplish the above objects, the present invention a one touch opening plug for an aquarium fish food container comprising: a) a plug body engaging with a top portion of a container body, the plug body including: a first depression formed on a top peripheral portion of the plug body; a food outlet hole formed on a bottom center of the first depression; a second depression formed on a top center of the plug body such that the first and second depressions are partially overlapped and communicate with each other, the second depression being deeper than the first depression; a guide protrusion eccentrically provided on the bottom of the second depression at a portion far from the first depression such that there is a gap between the guide protrusion and a side wall of the second depression; and a pair of opposite projections provided on the second depression's side wall at opposite portions near the first depression; b) a detachable tap received in the first depression, the tap including: a plate portion movably seated in the first depression; an embossment provided on a bottom surface of the plate portion to selectively block the food outlet hole of the first depression; a neck portion extending from one side of the plate portion and being sharpened at its free end to form a wedge tip of V-shaped cross-section; a pair of hinge pins provided on both sides of the neck portion, the hinge pins acting as a turning shaft of the plate portion; and a levering projection provided on a bottom surface of the neck portion, the levering projection acting as a point of turning action of the plate portion; c) a detachable spoon received in the second depression and pivoted to the tap, the spoon including: a radial insert slit receiving the neck portion of the tap, the insert slit being ended at a wedge groove brought into a slidable engagement with the wedge tip of the tap; a pair of hinge grooves engaging with the hinge pins of the tap and thereby pivoting the spoon to the tap, the hinge grooves being formed on both edges of the radial insert slit; a pair of grooves formed on a top surface of the spoon and adapted for engaging with the opposite projections of the second depression; and a side wall vertically extending from an edge of the spoon and thereby forming a spoon's bowl, the spoon's side wall being fitted into the gap between the guide protrusion and the first depression's side wall when the spoon is received in the second depression.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
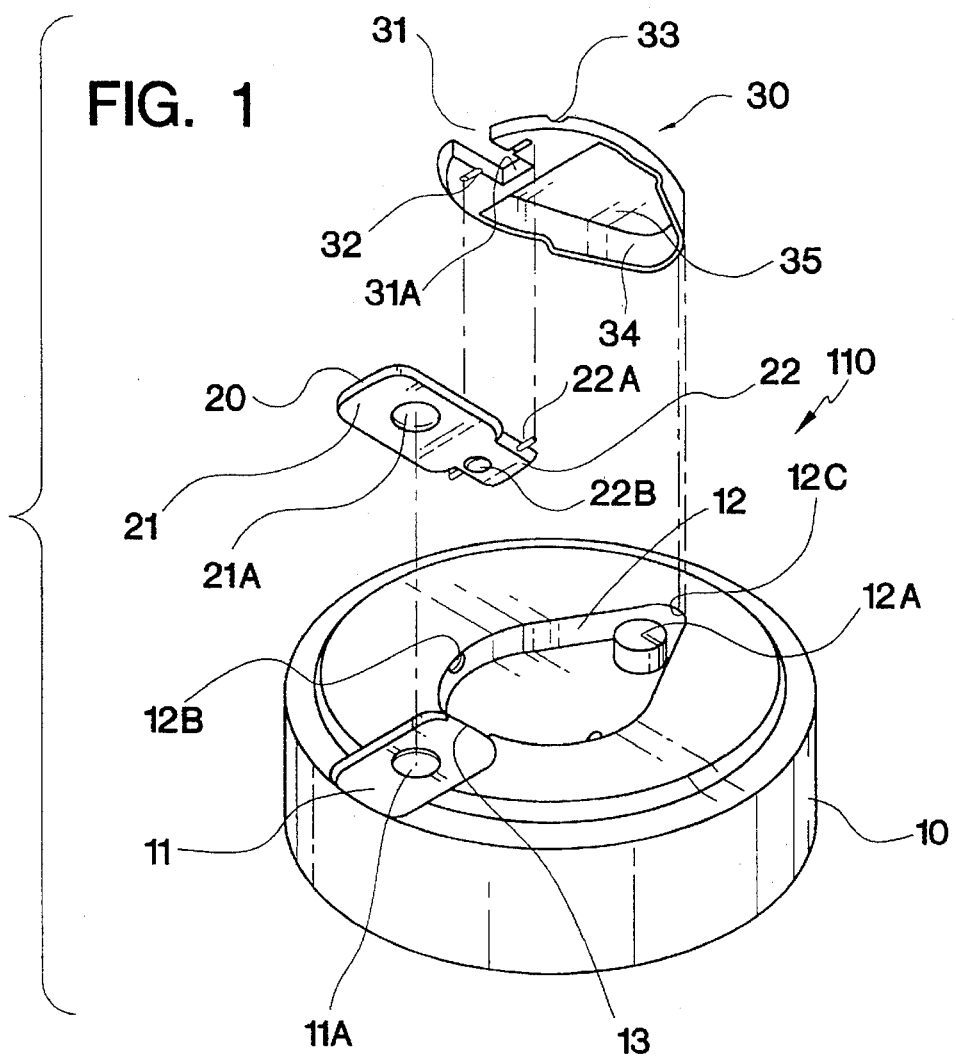
FIG. 1 is an exploded perspective view of a plug structure for aquarium fish food containers in accordance with an embodiment of the present invention.
Figure 2:
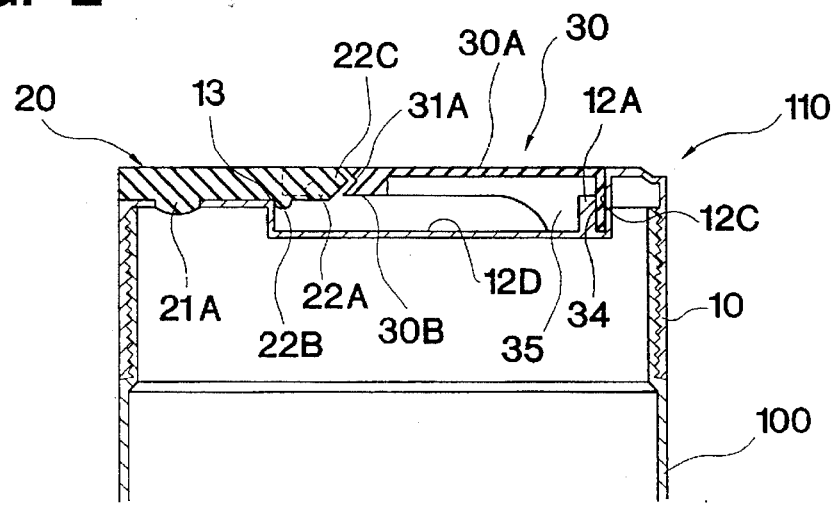
FIG. 2 is a sectional view of a food container with the plug structure of FIG. 1.

FIG. 1 is an exploded perspective view of a plug structure for aquarium fish food containers in accordance with an embodiment of the present invention. FIG. 2 is a sectional view of a food container with the above plug structure. As shown in the drawings, a plug 110 is screwed on the top of a food container body 100. The plug 110 comprises a plug body 10. The top wall of the plug body 10 is provided with both a detachable tap 20 and a detachable measuring spoon 30.

The above plug body 10 which is screwed on the top of the container body 100 has an adequate construction sufficient enough to control the amount of the food taken out of the container body 100. That is, the top wall of the plug body 10 is provided with a pair of depressions 11 and 12 having different sizes. A large-sized depression 12 for receiving the spoon 30 is formed about the top wall's center, while a small-sized depression 11 for receiving the tap 20 is formed on a peripheral portion of the plug body's top wall about the above large-sized depression 12. The two depressions 11 and 12 are partially overlapped and thereby communicate with each other at the overlapped portion between them. The bottom center of the small-sized depression 11 is provided with a food outlet hole 11A. Meanwhile, a guide protrusion 12A of circular cross-section is eccentrically provided on the bottom 12D of the large-sized depression 12. That is, the guide protrusion 12A stands on the bottom 12D at a portion near a side wall 12C of the depression 12 far from the small-sized depression 11. In other words, the above guide protrusion 12A is spaced apart from but close to the side wall 12C with a gap. A pair of opposite projections 12B are provided on the side wall 12C of the depression 12 near the above overlapped portion. The above projections 12B are for preventing the spoon 30 from being suddenly separated from the depression 12. The large-sized depression 12 is deeper than the small-sized depression 11.

The small-sized depression 11 has a structure sufficient enough to receive the tap 20 which is selectively opened to controllably take the food out of the food container. The large-sized depression 12 has a structure sufficient enough to receive the spoon 30 which is used for measuring the fixed amount of food.

The guide protrusion 12A is for guiding the spoon 30 when the spoon 30 is detachably seated in the depression 12. The height of the protrusion 12A is preferably lower than the height of the side wall 12C of the depression 12. Therefore, the spoon's surface 30A does not project from the top wall of the plug body 10 when the spoon 30 is seated in the depression 12 as shown in FIG. 2.

The opposite projections 12B of the depression 12 are for preventing the spoon 30 from being suddenly separated from the depression 12 as described above.

The tap 20 comprises an oval plate portion 21 which will be seated in the small-sized depression 11. A neck portion 22 integrally extends from one side of the plate portion 21.

The bottom surface of the tap 20 is provided with a hemispherical embossment 21A for blocking the food outlet hole 11A when the tap 20 is seated in the depression 11. The neck portion 22 is provided with a hinge pin 22A on each side thereof and a levering projection 22B on the bottom surface thereof. The neck portion 22 is also sharpened at its free end thereby forming a wedge tip 22C of V-shaped cross-section.

That is, the embossment 21A of the tap 20 is selectively inserted into the hole 11A and thereby blocks the hole 11A when the tap 20 is seated in the depression 11. The levering projection 22B of the tap 20 is brought into slidable contact with a corner 13 of the depression 11 and acts as a point of levering action in cooperation with the corner 13 when the tap 20 is turned about the hinge pins 22A to be opened or closed as will be described later herein. The corner 13 is an interfacial corner between the two depressions 11 and 12.

Figure 3:
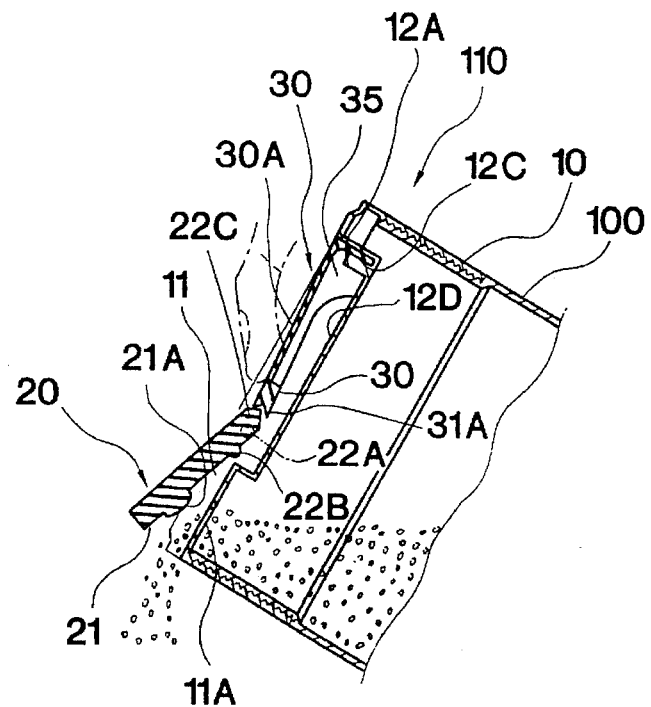
FIG. 3 is a sectional view of the food container of FIG. 2 when directly sprinkling the food into an aquarium with a tap of the container opened exclusively.

The opposite hinge pins 22A of the tap 20 engage with hinge grooves 32 formed in the spoon 30 and thereby pivot the tap 20 to the spoon 30 and make the tap 20 cooperate with the spoon 30. The hinge pins 22A also act as a turning shaft about which the tap 20 is turned in order to open or close the hole 11A of the depression 11. The spoon 30 is partially slitted to form a radial insert slit 31 which engages with the neck portion 22 of the tap 20. The above hinge grooves 32 for engaging with the tap's hinge pins 22A are formed in both edges of the radial insert slit 31 of the spoon 30. The above spoon's radial insert slit 31 is ended at a wedge groove 31A which is brought into slidable engagement with the wedge tip 22C of the tap 20 as shown in FIG. 2. When the spoon 30 seated in the depression 12 is pressed down by a finger at a portion above the wedge groove 31A as shown in FIG. 3, the wedge tip 22C of the tap 20 is pressed down while sliding in the wedge groove 31A. The tap 20 is thus turned above the hinge pins 22A thereby raising the plate portion 21 and opening up the hole 11A. In this state, the food can be taken out of the container through the hole 11A to be sprinkled into an aquarium.

The spoon 30 also has a pair of grooves 33 on its top surface 30A. When seating the spoon 30 in the depression 12, the above grooves 33 engage with the opposite projections 12B of the depression 12 and thereby prevent the spoon 30 from being suddenly separated from the depression 12. As described above, the spoon 30 is partially slitted to form the radial insert slit 31 which engages with the tap's neck portion 22. Both sides of the above radial insert slit 31 are provided with the hinge grooves 32 engaging with the tap's hinge pins 22A. The wedge groove 31A has a V-shaped cross-section which is similar to the cross-section of the tap's wedge tip 22C.

The elongated mouth's width of each hinge groove 32 formed on each edge of the slit 31 is shorter than the diameter of each groove 32 thereby allowing the hinge pins 22A of the tap 20 to be snapped into the grooves 32.

In the present invention, it is preferred to allow a slidable engagement between the tap's wedge tip 22C of V-shaped cross-section and the wedge groove 31C of the spoon's radial insert slit 31 rather than make them come into close contact with each other.

As described above, the pair of grooves 33 are formed on opposite edges of the top surface 30A of the spoon 30. The above grooves 33 engage with the opposite projections 12B of the depression 12 and thereby prevent the spoon 30 from being suddenly separated from the depression 12. A side wall 34 vertically extends from the edge of the spoon 30 at a portion far from the radial insert slit 31 and thereby forms a bowl 35 for spooning the food. As shown in FIG. 2, the above side wall 34 will be fitted into the gap between the guide protrusion 12A and the side wall 12C of the depression 12 when the spoon 30 is seated in the depression 12. The side wall 34 also has a height enough to come into contact with the bottom 12D of the depression 12 when fully seating the spoon 30 in the depression 12. The bottom of the spoon's bowl 34 is formed by partially depressing the surface 30B of the spoon 30. That is, the thickness of the bowl's bottom is thinner than that of the other portion including the radial insert slit 31.

In the present invention, both the tap 20 and the spoon 30 are preferably formed of a soft synthetic resin such that they are elastically deformed when the spoon 30 is pressed down by a finger at a portion above the wedge groove 31A. With the restoring force of the tap 20 and spoon 30 made of a soft synthetic resin, the levering motion of the tap 20 for opening or closing the hole 11A of the depression 11 may be smoothly performed.

When the top surface 30A of the spoon 30 is pressed down by a finger as shown in FIG. 3, the spoon 30 made of a soft synthetic resin is smoothly bent down about the guide protrusion 12A acting as a point of action and thereby raises the plate portion 21 of the tap 20 and opens the hole 11A. When the external force is removed from the spoon 30, the spoon 30 elastically returns to its original state.

The operational effect of the above plug structure will be described hereinbelow.

As shown in FIG. 3, the top surface 30A of the spoon 30 seated in the depression 12 is slightly pressed down by a finger, the spoon 30 is bent down about the guide protrusion 12A. In this state, the wedge tip 22C of the tap 20 received in the wedge groove 31A of the spoon's radial insert 31 is pressed down while sliding in the groove 31A. The tap 20 is thus turned relative to the spoon 30 about the hinge pins 22A and thereby raises the plate portion 21 and opens up the hole 11A.

In this case, the tap's bottom surface slides at the interfacial corner 13 acting as a point of levering action and thereby opens up the hole 11A.

When the food container 100 in the above state is tilted as shown in FIG. 3, the desired amount of food can be either poured out of the container 100 or sprinkled into an aquarium. In order to close the tap 20, the finger is removed from the spoon's top surface 30A and thereby causes the spoon 30 to elastically return to its original state by the restoring force accumulated in the spoon 30. In this case, the levering protrusion 22B of the tap 20 is hooked by the corner 13 and thereby allows the embossment 21A of the tap 20 to be precisely placed on the hole 11A. The hole 11A can be easily blocked by the embossment 21A when the tap 20 in the above state is slightly pressed down by a finger.

When it is required to either attend to sanitation or precisely measure the fixed amount of food when feeding the aquarium fishes using the above food container, the opened tap 20 which has been opened in the above-mentioned manner is lifted up by pulling the raised plate portion 21. Both the tap 20 and the spoon 30 which are pivoted together by the hinge pins 22A are thus separated from the plug body 10 at the same time.

Figure 4:
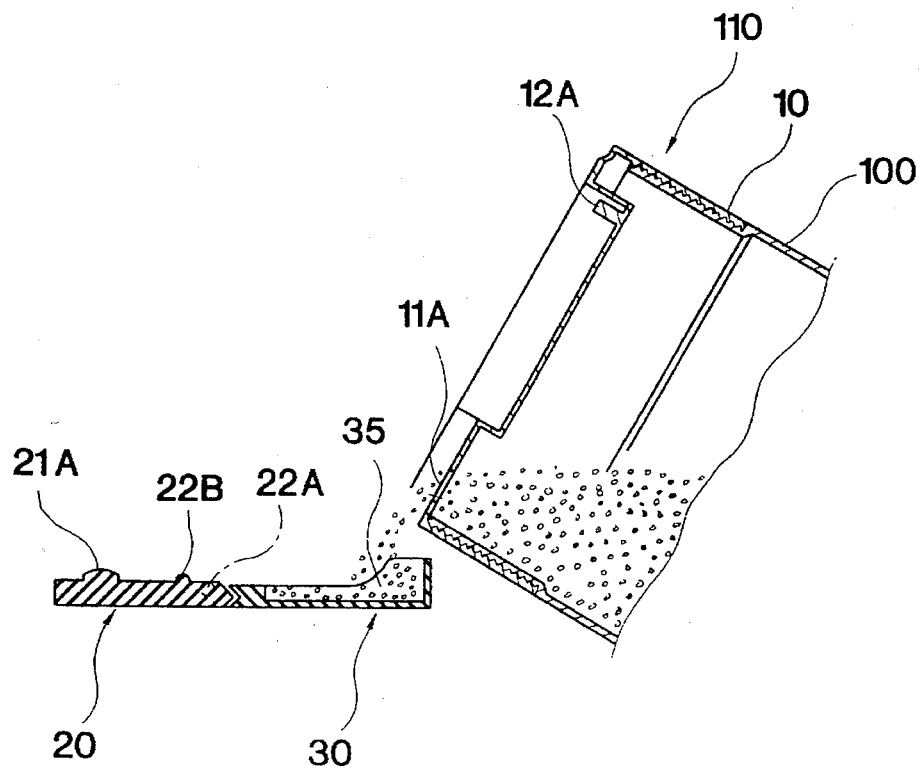
FIG. 4 is a sectional view of the food container of FIG. 2 when spooning the fixed amount of food prior to sprinkling the food into an aquarium.
Figure 5:
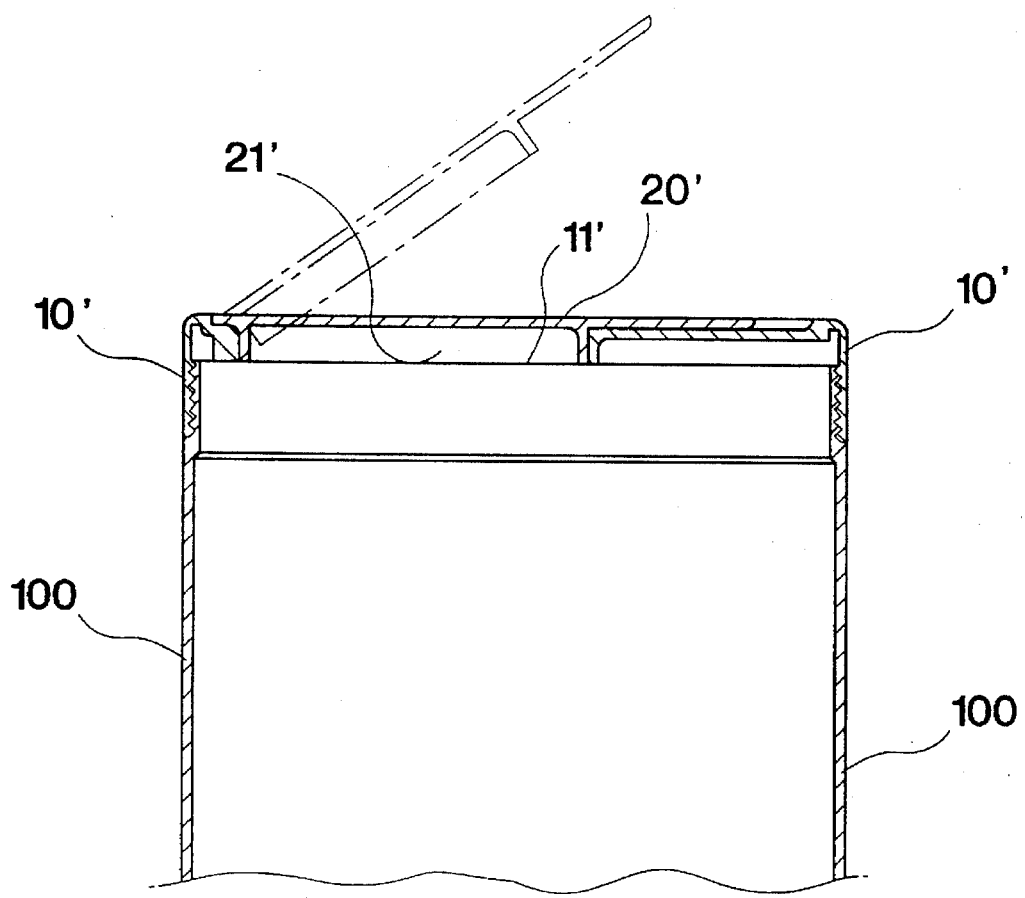
FIG. 5 is a sectional view of a food container with a conventional plug structure having a detachable measuring spoon.

After turning over the spoon 30 to make the bowl 34 up, the fixed amount of food may be carefully poured into the bowl 34 as shown in FIG. 4 and, thereafter, sprinkled into the aquarium.

After feeding the aquarium fishes while precisely measuring the fixed amount of food using the spoon 30, both the tap 20 and the spoon 30 are seated in their depressions 11 and 12 of the plug body 10 as will be described hereinbelow. At first, the spoon 30 is seated into the depression 12 by fitting the spoon's side wall 34 into the gap between the guide protrusion 12A and the side wall 12C of the depression 12 simultaneously with bringing the grooves 33 of the spoon 30 into engagement with the projections 12B of the depression 12. After seating the spoon 30 into the depression 12, the tap 20 pivoted to the spoon 30 is pressed down to be simply seated into the depression 11.

The embossment 21A formed on the bottom surface of the tap 20 blocks the hole 11A of the depression 11 when the tap 20 is seated in the depression 11 as described above. Therefore, both the tap 20 and the spoon 30 return to their original states in the plug body 10.

As described above, the present invention provides an improved plug structure for aquarium fish food containers wherein a plug opening tap is easily opened by a one touch depressing motion. That is, the tap is opened by depressing down the top surface of a measuring spoon pivoted to the tap and thereby gives convenience to users. In the above plug structure, the size of the food outlet hole selectively opened by the tap is reduced than that of a prior art plug structure proposed by this applicant. Therefore, the above plug structure allows the desired amount of food to be taken out of the food container. Particularly when it is required to either attend to sanitation or precisely measure the fixed amount of food when feeding the aquarium fishes, the spoon pivoted to the tap is separated from the plug body. After separating the spoon from the plug body, the fixed amount of food can be carefully poured into the spoon's bowl and, thereafter, sprinkled into an aquarium. Therefore, the above plug structure prevents food from dropping when measuring the fixed amount of food and thereby saves food.

Another advantage of the above plug structure is resided in that it can be freely used with any container requiring a small amount of powered or granulated content to be taken out of the container.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A one touch opening plug for an aquarium fish food container comprising:

a) a plug body engaging with a top portion of a container body, said plug body including:
      a first depression formed on a top peripheral portion of said plug body;
      a food outlet hole formed on a bottom center of said first depression;
      a second depression formed on a top center of said plug body such that said first and second depressions are partially overlapped and communicate with each other, said second depression being deeper than the first depression;
      a guide protrusion eccentrically provided on the bottom of said second depression at a portion far from said first depression such that there is a gap between said guide protrusion and a side wall of said second depression; and
      a pair of opposite projections provided on said second depression's side wall at opposite portions near said first depression;
   b) a detachable tap received in said first depression, said tap including:
      a plate portion movably seated in said first depression;
      an embossment provided on a bottom surface of said plate portion to selectively block said food outlet hole of the first depression;

a neck portion extending from one side of said plate portion and being sharpened at its free end to form a wedge tip of V-shaped cross-section;
   a pair of hinge pins provided on both sides of said neck portion, said hinge pins acting as a turning shaft of said plate portion; and
   a levering projection provided on a bottom surface of said neck portion, said levering projection acting as a point of turning action of said plate portion;
c) a detachable spoon received in said second depression and pivoted to said tap, said spoon including:
   a radial insert slit receiving said neck portion of the tap, said insert slit being ended at a wedge groove brought into a slidable engagement with said wedge tip of the tap;
   a pair of hinge grooves engaging with said hinge pins of the tap and thereby pivoting said spoon to said tap, said hinge grooves being formed on both edges of said radial insert slit;
   a pair of grooves formed on a top surface of said spoon and adapted for engaging with said opposite projections of the second depression; and
   a side wall vertically extending from an edge of said spoon and thereby forming a spoon's bowl, said spoon's side wall being fitted into the gap between said guide protrusion and said first depression's side wall when said spoon is received in said second depression.

* * * * *